UNITED STATES PATENT OFFICE.

OTTO RÖHM, OF DARMSTADT, GERMANY.

SOLID NON-HYGROSCOPIC IRON SALT AND THE PREPARATION THEREOF.

1,383,264.     Specification of Letters Patent.     Patented June 28, 1921.

No Drawing.     Application filed July 16, 1920. Serial No. 396,876.

*To all whom it may concern:*

Be it known that I, OTTO RÖHM, a citizen of the Free State of Wurttemberg, in the German Republic, residing at Darmstadt, in the State of Hessia, Germany, have invented Improvements in Solid Non-Hygroscopic Iron Salts and the Preparation Thereof, for which I have filed applications in Germany, December 27, 1918, and April 11, 1919, and I do hereby declare the following to be a full, clear, and exact description of the same.

For various technical purposes, as for instance for tanning, chlorid of iron can be well made use of. This product has however two objectionable properties, which make its employment on a large scale difficult.

A water solution of chlorid of iron can be transported only in glass vessels, because it is very liable to set hydrochloric acid free and therefore destroys all other vessels. The transport on a large scale in glass vessels is not practicable, as in addition, the disadvantage occurs, that the salt becomes crystallized in winter and has to be liquefied before it can be used.

If it is desired to send the chlorid of iron in crystallized state, then the water solution can be boiled only in vessels of clay, glass, quartz or precious metal and the vapors of the hydrochloric acid evaporating with the steam of the water must be again condensed.

These technical difficulties induced the inventor to search for a substitute for the chlorid of iron, which does not possess the disadvantageous properties of same and he was successful in producing a solid iron salt nonhygroscopic and especially advantageously suitable for tanning purposes.

According to the invention chlorin takes effect on sulfate of iron in a state of solution, containing crystal water or water free. By this a new iron salt is created, the composition of which corresponds to the formula $FeSO_4Cl$ or $FeSO_4Cl.6H_2O$. If chlorin is passed over crystals of sulfate of iron, which as is well known, contain 7 molecules of water, then they melt and there results direct a 60% solution of $FeSO_4Cl$ in the water. If the solution is concentrated by the water bath, then a syrup is obtained, which is transformed into a yellow crystal cake, when it cools and is allowed to stand a little time.

It was further observed that when boiling down takes place under ordinary atmospheric pressure, disturbances can occur by hydrolysis of the ferri-sulfate-chlorid, which can be avoided however by effecting the boiling down of the solution under lower temperature, that is under lower air pressure. If the solution is boiled down till it contains about 37% water (corresponding to 6 mol. $H_2O$ to $FeSO_4Cl$) then the cooled and if necessary inoculated mass becomes solid and forms solid crystals in a short time of the composition $FeSO_4Cl.6H_2O$.

That a chemical combination and not a mixture has taken place, is proved by the fact that the new salt dissolves in alcohol, whereas ferric-sulfate is insoluble. The produced salt is also stable in damp air, whereas a mixture of ferric-chlorid and ferric-sulfate becomes liquefied.

In the manufacture of the new iron salt the otherwise necessary measures, when boiling down salt fluids, are dispensed with. As the stable product is not hygroscopic, it is most favorable as regards packing and transport. Under these circumstances it is very possible that the new salt will find a market not only for tanning but also for other purposes.

*Examples.*

1. Over 600 kilos iron scrap of 90–95 percentage of iron 6300 liters of water are poured and 1050 kilos of sulfuric acid of 96% are added. After the fluid has become neutral, the solution of ferrous-sulfate is filtered and treated with chlorin, till the ferrous-sulfate has disappeared. The solution thus treated with chlorin is boiled down at 150 mm. pressure and 50–55° to the specific gravity of 1.775 or 65° Bé. at 40 degrees; there is then about 37% of water contained in same. The hot mass is poured into molds, cooled and inoculated. It becomes solid in a few hours and forms a hard yellow crystal cake of ferri-sulfate-chlorid of the formula $FeSO_4Cl.6H_2O$.

The product melts at 50–55 degrees, dissolves very easily in water, slightly less so in alcohol. In most organic solvents it is insoluble. The analysis of the raw product solidified from the liquid state supplied the following figures:

|   | Found. | Calculated for $FeSO_4Cl.6H_2O$. |
|---|---|---|
| Fe | =18.91% | Fe =18.92% |
| $SO_4$ | =31.69% | $SO_4$ =32.43% |
| Cl | =11.86% | Cl =11.95% |
| $H_2O$ | =37.54% | $H_2O$ =36.7 % |

The same salt crystallizes also out of solutions prepared in a different manner, if they contain, iron, chlorin and sulfuric acid in the weight proportions corresponding to the combination $FeSO_4Cl.6H_2O$ and have been boiled down to a water percentage of 37% in a space with reduced air pressure.

Finally the boiling down can be quite avoided if all the ingredients of the ferric-sulfate-chlorid including the water are brought together in the same proportion, in which they are contained in the new product. One would therefore bring together either: 1 mol. of ferric-chlorid ($FeCl_3$) with 1 mol. ferric-sulfate and 18 mol. of water or 1 mol. of ferric-chlorid ($FeCl_3$) with 1 mol. of sulfuric acid ($H_2SO_4$) and 6 mol. of water. In the latter case the hydrochloric acid, which is delivered must be removed.

The formation of the ferri-sulfate-chlorid $FeSO_4Cl.6H_2O$ takes place according to the equations:

$$FeCl_3 + Fe_2(SO_4)_3 + 18H_2O = 3FeSO_4Cl.6H_2O.$$

$$FeCl_3 + H_2SO_4 + 6H_2O = FeSO_4Cl.6H_2O + 2HCl.$$

2. 270 parts of iron-chlorid ($FeCl_3.6H_2O$) are powdered and placed in 98 parts of 100% sulfuric acid. At the finish of the development of the hydrochloric acid, which can be accelerated by reduced air pressure, the reaction product solidifies as the same firm yellow mass as above.

3. 270.5 parts of crystallized iron chlorid ($FeCl_3.6H_2O$) are intimately mixed with 562 parts of crystallized ferric-sulfate ($Fe_2(SO_4)_3.9H_2O$) and the mixture exposed to humid air, whereby it partly dissolves. After some time the product solidifies as a yellow crystallized hard mass consisting of ferri-sulfate-chlorid.

In the different processes of making my ferri-sulfate-chlorid no acid is added to the re-action mixture, and any acidity is due to hydrolysis of salts present.

I claim:

1. A process for producing a non-hygroscopic iron salt, especially suitable for tanning purposes, comprising intermixing $\overset{+++}{Fe}$ ions, $\overline{SO}_4$ ions and chlorin, in a medium which has no greater acidity than that produced by the said ingredients.

2. Process for the production of a non-hygroscopic iron salt, especially for tanning purposes, comprising causing chlorin to take effect on green vitriol under conditions of no greater acidity than that produced by the said ingredients.

3. Process for the production of nonhygroscopic iron salt, especially suitable for tanning purposes, comprising concentrating the water solutions, which contain iron, chlorin and sulfuric acid in the proportions by weight corresponding to the formula $FeSO_4Cl$, under reduced air pressure until a water content of 37% is reached.

4. Process for the production of a non-hygroscopic iron salt, especially suitable for tanning purposes, comprising bringing together all the radicals of crystallized ferri-sulfate-chlorid including the water in the weight proportions of the formula $FeSO_4Cl.6H_2O$.

5. An iron salt containing ferric iron, two valency bonds of which are attached to an "$SO_4$" radical and one bond to a "Cl" radical.

6. A chemical compound having the formula "$FeSO_4Cl$".

7. A chemical compound having the formula "$FeSO_4Cl$" and including water of crystallization.

8. A chemical compound having the formula $FeSO_4Cl.6H_2O$.

In testimony whereof, I have signed my name to this specification in the presence of two subscribing witnesses.

Dr. OTTO RÖHM.

Witnesses:
Hugo T. Ahuf,
Dr. Wilhelm Andres.